US010831896B2

(12) United States Patent
Brant et al.

(10) Patent No.: US 10,831,896 B2
(45) Date of Patent: *Nov. 10, 2020

(54) RUNNING LOCAL VIRTUAL DISKS CONTAINING APPLICATIONS WITH LIMITED LICENSES

(71) Applicant: International Business Machines Corporation, Armonk, NY (US)

(72) Inventors: Charles D. Brant, Raleigh, NC (US); Donald A. Cronin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

This patent is subject to a terminal disclaimer.

(21) Appl. No.: 14/335,888

(22) Filed: Jul. 19, 2014

(65) Prior Publication Data
US 2015/0169876 A1 Jun. 18, 2015

Related U.S. Application Data

(63) Continuation of application No. 14/105,727, filed on Dec. 13, 2013.

(51) Int. Cl.
*G06F 21/57* (2013.01)
*G06F 21/12* (2013.01)
(Continued)

(52) U.S. Cl.
CPC ........ *G06F 21/575* (2013.01); *G06F 9/45533* (2013.01); *G06F 9/45558* (2013.01);
(Continued)

(58) Field of Classification Search
CPC ........ G06F 21/10; G06F 21/602; G06F 21/78; G06F 21/575; G06F 9/45533;
(Continued)

(56) References Cited

U.S. PATENT DOCUMENTS 8,341,625 B2 * 12/2012 Ferris ............... G06F 9/45558
718/1
2006/0004667 A1 * 1/2006 Neil ................... G06F 21/126
705/59
(Continued)

OTHER PUBLICATIONS

Ronald Petrlic; "Privacy-Preserving Digital Rights Management in a Trusted Cloud Environment"; file 'Privacy-Preserving Digital Rights Management in a Trusted Cloud Environment.pdf' (Year: 2012).*

(Continued)

*Primary Examiner* — Patrick McAtee
*Assistant Examiner* — Edgar R Martinez-Hernandez
(74) *Attorney, Agent, or Firm* — Alexander G. Jochym

(57) ABSTRACT

Provided are techniques for receiving, from a client at a server, a request to access a software package for a specified duration of time, wherein the software package requires a license key; requesting the license key from a key server; transmitting a base virtual machine in conjunction with the software package and the license key to the client; booting the base virtual machine on the client; and utilizing an encrypted disk containing the software package on the booted base virtual machine at the client for the duration of time.

7 Claims, 4 Drawing Sheets

(51) Int. Cl.
*G06F 9/455* (2018.01)
*G06F 8/61* (2018.01)
*G06Q 50/18* (2012.01)
*H04L 29/06* (2006.01)

(52) U.S. Cl.
CPC ......... *G06F 21/121* (2013.01); *G06Q 50/184* (2013.01); *H04L 63/0428* (2013.01); *H04L 63/06* (2013.01); *G06F 8/63* (2013.01); *G06F 2009/45562* (2013.01); *G06F 2009/45575* (2013.01); *G06F 2221/2137* (2013.01); *G06Q 2220/18* (2013.01)

(58) Field of Classification Search
CPC . G06F 9/45558; G06F 21/121; G06Q 20/123; G06Q 50/184
See application file for complete search history.

(56) References Cited

U.S. PATENT DOCUMENTS

| | | | | |
|---|---|---|---|---|
| 2008/0127170 | A1* | 5/2008 | Goldman | G06F 8/61 717/174 |
| 2010/0077479 | A1* | 3/2010 | Viljoen | G06F 21/577 726/23 |
| 2011/0093847 | A1* | 4/2011 | Shah | G06F 9/45558 718/1 |
| 2011/0126197 | A1* | 5/2011 | Larsen | H04L 9/3213 718/1 |
| 2011/0209064 | A1* | 8/2011 | Jorgensen | H04W 12/0602 715/733 |
| 2011/0258082 | A1* | 10/2011 | Schmieder | G06F 21/10 705/27.1 |
| 2011/0276806 | A1* | 11/2011 | Casper | G06F 21/602 713/189 |
| 2012/0027374 | A1* | 2/2012 | Lipkind | H04N 5/775 386/230 |
| 2012/0110328 | A1* | 5/2012 | Pate | H04L 63/062 713/165 |
| 2012/0173871 | A1* | 7/2012 | Ashok | G06F 21/575 713/153 |
| 2012/0331463 | A1* | 12/2012 | Orveillon | G06F 8/63 718/1 |
| 2013/0007889 | A1* | 1/2013 | McCloy | G06F 8/61 726/26 |
| 2013/0111221 | A1* | 5/2013 | Fujii | G06F 3/0604 713/193 |
| 2013/0132942 | A1* | 5/2013 | Wang | G06F 8/61 717/176 |
| 2016/0342488 | A1* | 11/2016 | Lim | G06F 9/5077 |

OTHER PUBLICATIONS

Authors Disclosed Anonymously; "Event-Driven Software Distribution in a Cloud-Computing Infrastructure"; file 'Event-Driven Software Distribution in a Cloud-Computing Infrastructure.pdf' (Year: 2011).*

Authors: IBM; "Software evaluation management in an enterprise provisioning environment with virtual machines"; file 'Software evaluation management.pdf' (Year: 2009).*

Marta Beltran and Antonio Guzman; "An Automatic Machine Scaling Solution for Cloud Systems"; file 'An Automatic Machine Scaling Solution for Cloud Systems.pdf' (Year: 2012).*

* cited by examiner

RUNNING LOCAL VIRTUAL DISKS CONTAINING APPLICATIONS WITH LIMITED LICENSES

CROSS-REFERENCES TO RELATED APPLICATIONS

The present application is a continuation and claims the benefit of the filing date of an application entitled, "Running Local Virtual Disks Containing Applications With Limited Licenses" Ser. No. 14/105,727, filed Dec. 13, 2013, assigned to the assignee of the present application, and herein incorporated by reference

FIELD OF DISCLOSURE

The claimed subject matter relates generally to cloud computing and, more specifically, to techniques for enabling virtual machines (VMs) associated with a cloud to run on a user's computing device rather than on infrastructure associated with the cloud.

BACKGROUND OF THE INVENTION

Institutions such as universities may provide cloud computing resources for the benefit of associated users. These cloud computing resources, including networking infrastructure, are often maintained at considerable expense while resources of the users, such as laptop computers, are employed as little more than dumb terminals. Typically, this configuration is provided to control a limited number of application license keys.

For example, a user may register for a VM to use a specific software package for a period of time such as two (2), four (4) or eight (8) hours. However, the user will not receive access unless there are available licenses. Once access to the VM is received, the user must remain connected to the corresponding network for the duration of the period to utilize the software package. This generates unnecessary expense for the institution with respect to computing and network resources while underutilizing the user's personal resources such as, but not limited to, a laptop or personal computer.

SUMMARY

Provided are techniques for enabling virtual machines (VMs) associated with a cloud computing architecture, or simply "cloud," to run on a user's computing device rather than on infrastructure associated with the cloud.

Provided are techniques for receiving, from a client at a server, a request to access a software package for a specified duration of time, wherein the software package requires a license key; requesting the license key from a key server; transmitting a base virtual machine in conjunction with the software package and the license key to the client; booting the base virtual machine on the client; and utilizing an encrypted disk containing the software package on the booted base virtual machine at the client for the duration of time.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
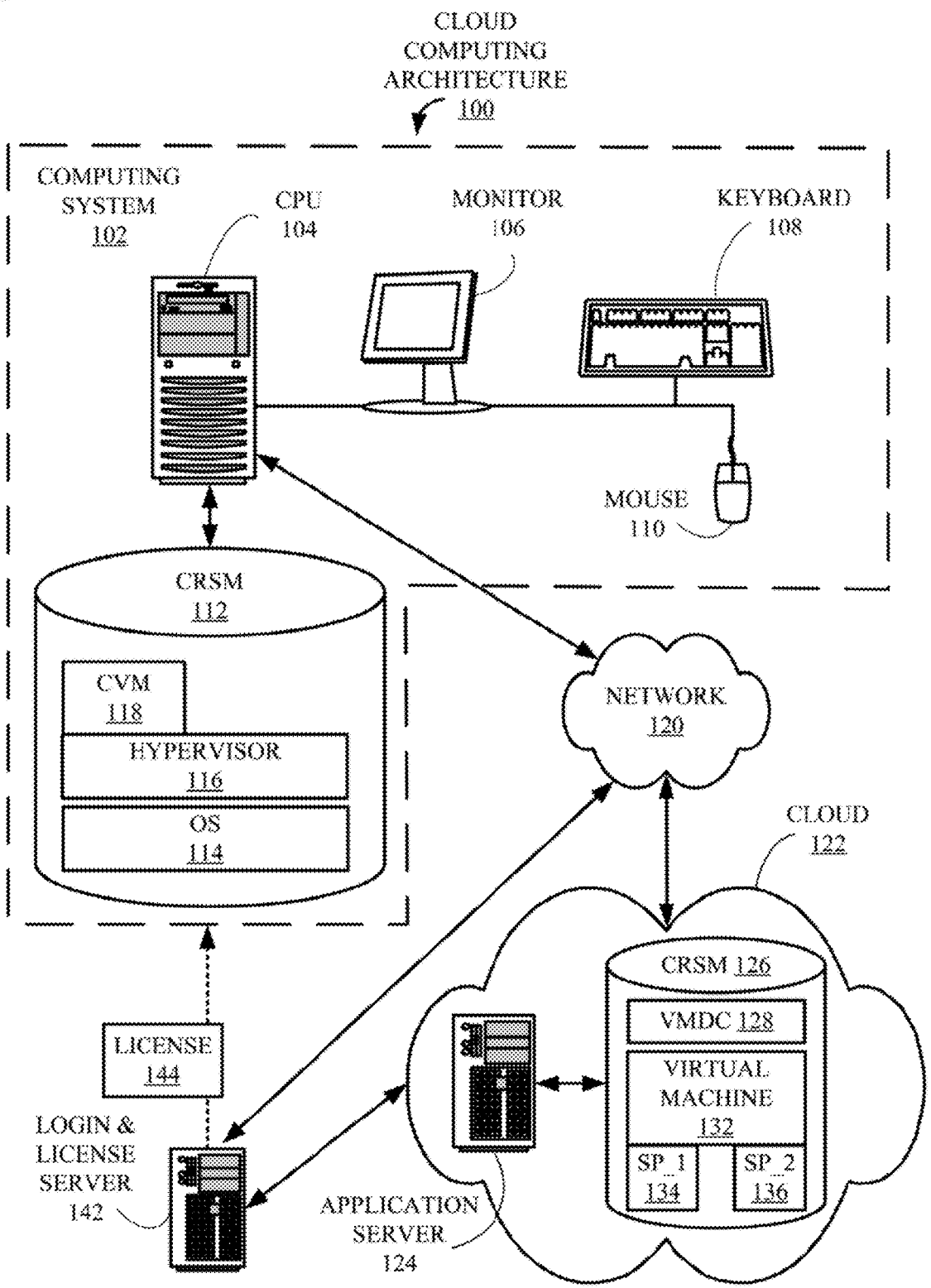
FIG. 1 is an example of a cloud computing architecture that may implement the claimed subject matter.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means tar implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of one example of a cloud computing architecture 109 that may incorporate the claimed subject matter. A computing system 102 includes a central processing unit (CPU) 104, coupled to a monitor 106, a keyboard 108 and a pointing device, or "mouse," 110, which together facilitate human interaction with architecture 100 and computing system 102. Computing system 102 is used as an example of a client device that may be provided with applications and virtual machines in accordance with the claimed subject matter.

Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing logic associated with an operating system (OS) 114, a hypervisor 116 and a custom virtual machine (CVM) 118 provided and operated in accordance with the claimed subject matter. It should be noted that a typical computing system would include more elements, but for the sake of simplicity only a few are illustrated.

Computing system 102 and CPU 104 are connected to a network 120, which is also connected to cloud resources, or simply a "cloud," 122. Network 120 may be any available communication medium including, but not limited to, the Internet, a local area network (LAN) or a direct wire. One resource associated with cloud 122 is an application server 124. Application server 124 is coupled to a CRSM 126, which stores logic associated with a Virtual Machine Distribution Center (VMDC) 128, a virtual machine 132 and two associated software packages, i.e., a SP_1 134 and SP_2 136. VMDC 128 implements aspects of the claimed subject matter and is described in more detail below in conjunction with FIGS. 2-4. Virtual machine 132, SP_1 134 and SP_2 1368 are used thorough out the Specification as examples of cloud resource that may be made available to clients such as computing system 102 by VMDC 128 in accordance with the claimed subject matter. It should be understood that other resources and types of resources may be made available in a similar fashion.

Also coupled to both network 120 and cloud 122 thereby available to computing system 102 is a login and license (L&L) server 142. Server 142 is illustrated providing a license 144, which typically takes the form of a key or token, to computing system 102 to make CVM 118 available to a user in accordance with the disclosed technology. It should be noted there are many possible cloud computing configurations, of which architecture 100 is only one simple example used for the purposes of illustration. The role of L&L server 142 and license 144 are described in more detail below in conjunction with FIGS. 2-4.

Figure 2:
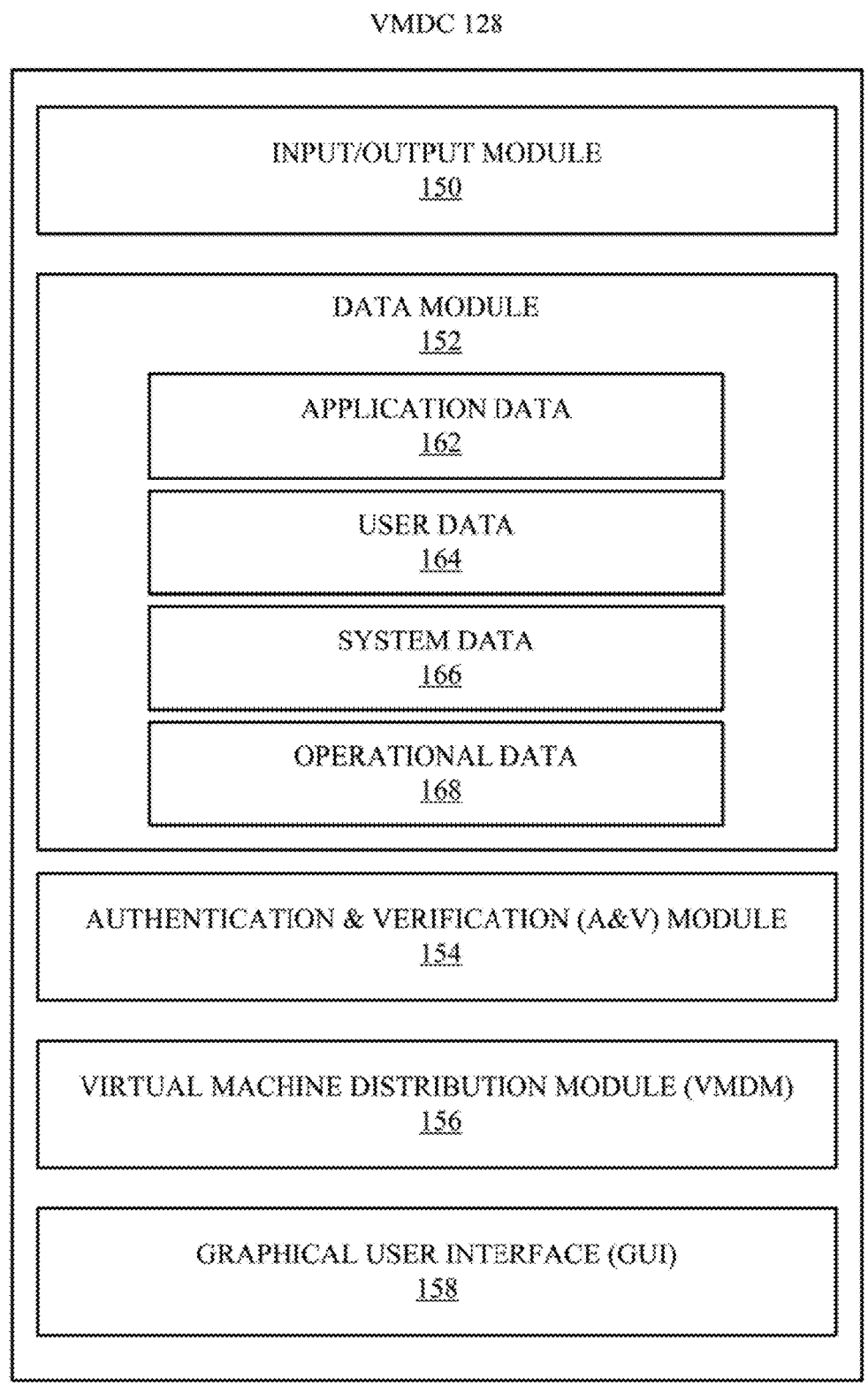
FIG. 2 is a block diagram of a Virtual Machine Distribution Center (VMDC), first introduced above in conjunction with FIG. 1, that implements aspects of the claimed subject matter.

FIG. 2 is a block diagram of VMDC 128, first introduced above in conjunction with FIG. 1, in more detail. VMDC 128 includes an input/output (I/O) module 150, a data module 152, an authentication and verification (A&V) module 154, a virtual machine distribution module 156 and a graphical user interface module, or simply "GUI," 158. For the sake of the following examples, VMDC 128 logic associated with VMDC 128 is assumed to be stored on CRSM 126 and execute on one or more processors (not shown) of application server 124 (FIG. 1). It should be understood that the claimed subject matter can be implemented in many types of computing systems and data storage structures but, for the sake of simplicity, is described only in terms of application server 124 and architecture 100 (FIG. 1). Further, the representation of VMDC 128 in FIG. 2 is a logical model. In other words, components 150, 152, 154, 156 and 158 may be stored in the same or separates files and loaded and/or executed within cloud 122 either as a single system or as separate processes interacting via any available inter process communication (IPC) techniques.

I/O module 150 handles any communication VMDC 128 has with other components of architecture 100. Data module 152 is a data repository for information that VMDC 128 requires during normal operation. Examples of the types of information stored in data module 142 include application data 162, user data 164, system data 166 and operating parameters 168. Application data 162 stores the names and configuration data for programs or applications that have been designated as potential applications of VMDC 128 that may be provided to users in accordance with the claimed subject matter. In the following examples, SP_1 134 (FIG. 1) and SP_2 136 (FIG. 1) are used as examples of such programs. User data 164 stores the names and configuration and verification data associated with potential users of the disclosed technology. System data 166 stores information associated with potential systems to which VMDC 128 may be requested to provide applications in accordance with the claimed subject matter. Computing system 102 (FIG. 1) is used as an example of such a system and the data stored in system data 166 may include, but is not limited to, information that identifies OS 114 (FIG. 1), hypervisor 116 (FIG. 1) and addressing information. Operating parameters 168 includes information on various administrator preferences that have been set to control the operation of VMDC 128. For example, an administrator may determine that a request for a particular application of less than one hour in duration is too short to implement in accordance with the claimed subject matter and should be provided in a conventional fashion.

A&V module 154 determines whether or not to request for the provision of an application is from an authorized user, typically by means of an interaction with L&L server 142 (FIG. 1). In addition, A&V module 154 is responsible for directing L&L server 142 to provide license 144 (FIG. 1) to computing system 102 once a determination that CVM 118 (FIG. 1) is to be provided to the requesting user. VMDM 156 is responsible for the preparation and transmission of CVM 118 to computing system 102. GUI component 158 enables administrators of VMDC 128 to interact with and to define the desired functionality of VMDC 128, typically be the setting of parameters in operating parameters 168.

Figure 3:
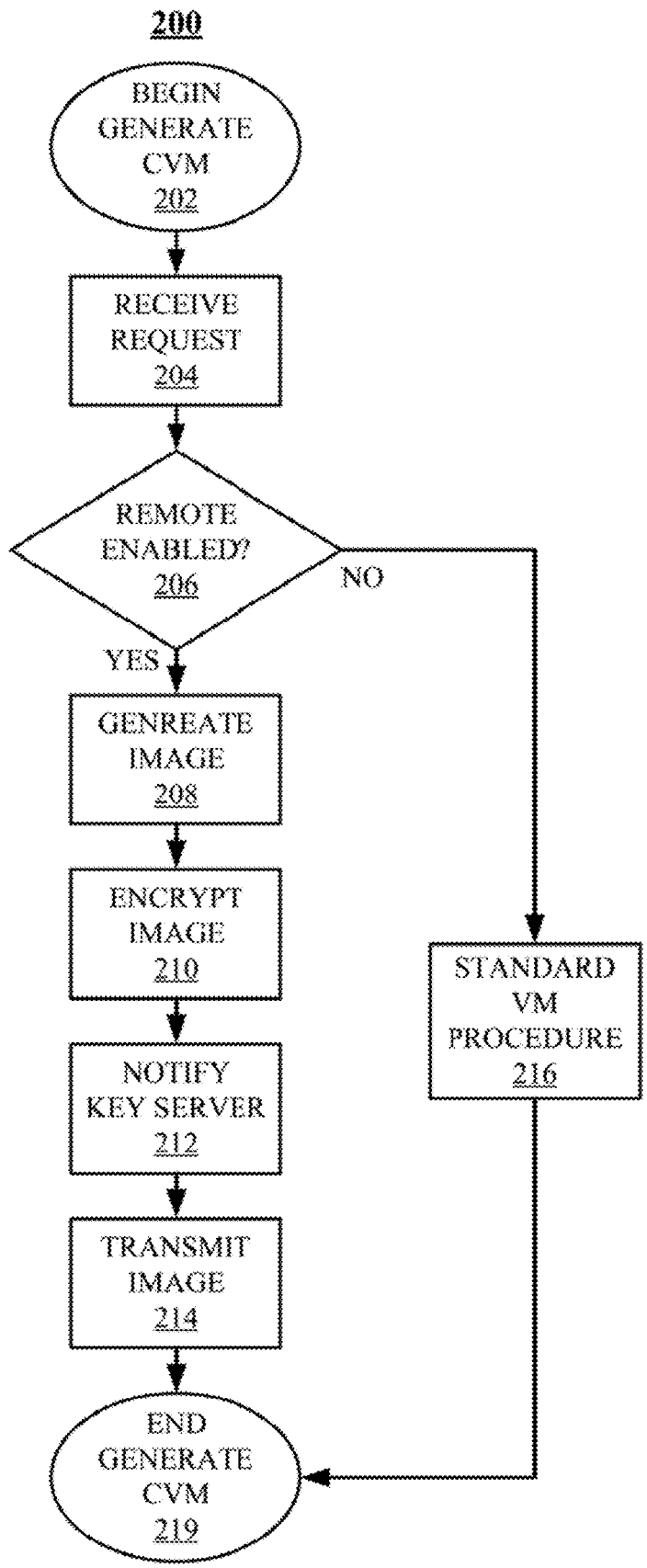
FIG. 3 is a flowchart of one example of a "Generate Custom Virtual Machine (CVM)" process that may implement aspects of the claimed subject matter.

FIG. 3 is a flowchart of one example of a "Generate Custom Virtual Machine (CVM)" process 200 that may implement aspects of the claimed subject matter. In this example, process 200 is associated with logic stored on CRSM 126 (FIG. 1) in conjunction with VMDC 128 (FIG. 1) and executed on one or more processors (not shown) of application server 124 (FIG. 1). Process 200 starts in a "Begin Generate CVM" block 202 and proceeds immediately to a "Receive Request" block 204. During processing associated with block 204, a request for a CVM associated with a particular software package such as SP_1 134 (FIG. 1) or SP_2 136 (FIG. 1) is received from as user, which in the following example is a user on computing system 102 (FIG. 1).

During processing associated with a "Remote Enabled?" block 206, a determination is made as to whether or not the computing system from which the request originated and the user that initiated the request are authorized (see 154, FIG. 2) and configured to receive a CVM, which in this example is associated with a software package such as SP_1 134 (FIG. 1) or SP_2 136 (FIG. 1). If so, control proceeds to "Generate Image" block 208 and an image of SP_1 134 or SP_2 136 is generated as a CVM, which in this example is CVM 118 (FIG. 1). During processing associated with an "Encrypt Image" block 210, the image generated during processing associated with block 208 is encrypted, either by using a key provided by L&L server 142 (FIG. 1) or generated by VMDC 128 (see 156, FIG. 2).

During processing associated with a "Notify Key Server" block 212, L&L server 142 is notified that a CVM has been generated and encrypted and a key, if not originally provided by server 142, to unlock the image is provided to server 142 to be transmitted to the user. During processing associated with a "Transmit Image" block 214, CVM 118, generated during processing associated with block 208 and encrypted during processing associated with block 210, is transmitted to computing system 102 and the user that requested it.

If, during processing associated with block 206, a determination is made that the user requesting the remote CVM in either not authorized or configured properly, control proceeds to a "Standard Virtual Machine (VM) Procedure" block 216. During processing associated with block 216, the user is provided access to a CVM on cloud 122 in accordance with commonly available procedures. Once processing has concluded in either of blocks 214 or 216, control proceeds to an "End Generate CVM" block 219 during which process 200 is complete.

Figure 4:
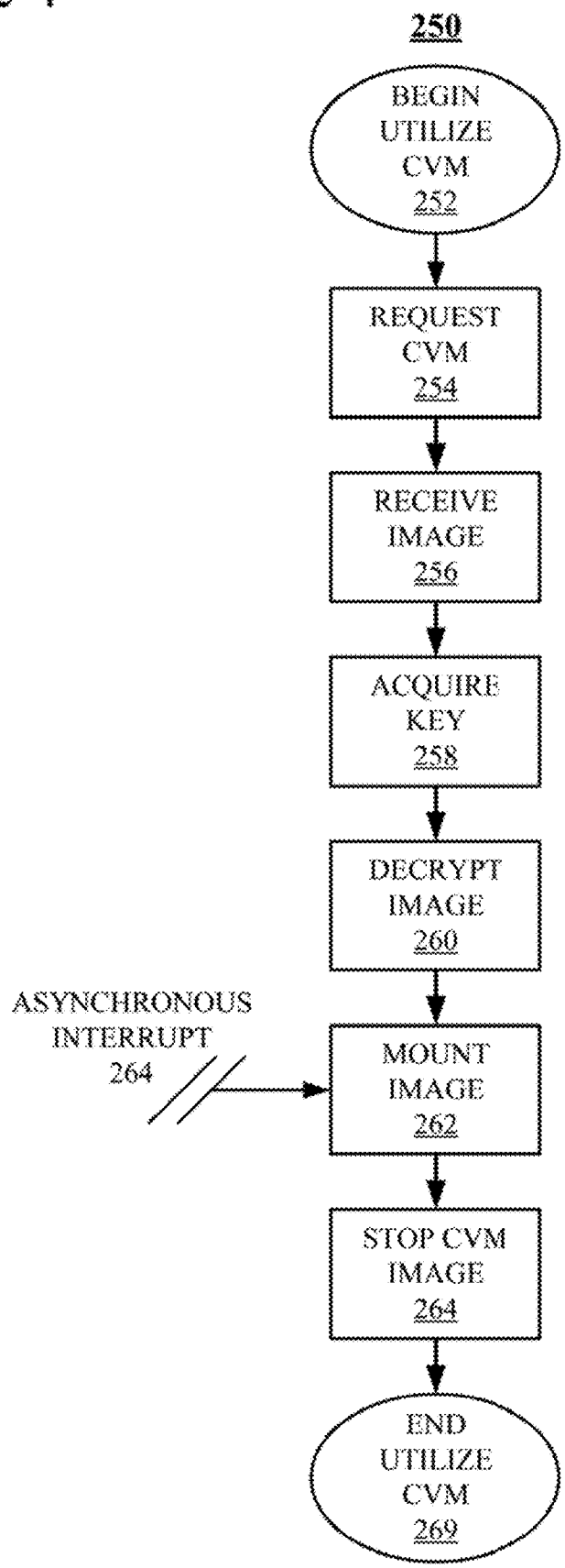
FIG. 4 is a flowchart of one example of a "Utilize CVM" process that may implement aspects of the claimed subject matter.

FIG. 4 is a flowchart of one example of a "Utilize CVM" process 250 that may implement aspects of the claimed subject matter. In this example, process 250 is associated with logic stored on CRSM 112 (FIG. 1) and executed on one or more processors (not shown) of computing system 102 (FIG. 1).

Process 250 starts in a "Begin Utilize CVM" block 252 and proceeds immediately to a "Request CVM" block 254. In this example, during processing associated with block 254, a user on computing system 102 transmits to VMDC 128 (FIG. 1) and application server 124 a request for a CVM (see 204, FIG. 3). It should be noted that the processing associated with process 250 is predicated on the assumption that the user and computing system 102 are both authorized and configured to receive a CVM (see 206, FIG. 3).

During processing associated with a "Receive Image" block 256, computing system 102 receives the image generated and encrypted by VMDC 128 (see 214 FIG. 3), which in this example is CVM 118 (FIG. 1) During processing associated with an "Acquire Key" block 258, a key to decrypt CVM 118 is requested and received from L&L server 142 (FIG. 1). During processing associated with a "Decrypt Image" block 260, CVM 118 is decrypted using the key acquired during processing associated with block 258. During processing associated with a "Mount Image" block 262. CVM 118, which was decrypted during processing associated with block 260 is mounted on OS 114 (FIG. 1) and therefore available for use by hypervisor 116 (FIG. 1). Once CVM 118 has been mounted, the corresponding software package, in this example SP_1 134 (FIG. 1) or SP_2 136 (FIG. 1), is available to the user.

An asynchronous interrupt 264 is received by OS 114 in the event that either a timeout or shutdown signal is received. Interrupt 264 causes process 250 to proceed to a "Stop CVM image" block 264 during which CVM 118 is made unavailable to the user by disabling CVM 118. Finally, control proceeds to an "End Utilize CVM" block 269 during which process 250 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function m combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    receiving, over a network from a client computing device, not hosted on a cloud, at a server computing device, hosted on a cloud, a request to access a software package for a specified duration of time;
    generating a custom virtual machine (CVM) corresponding to the software package;
    encrypting the CVM with a license key;
    transmitting the CVM to the client; and
    transmitting the license key to the client computing device;
    decrypting, by the client computing device, the CVM with the license key;
    booting the CVM on the client computing device; and
    terminating the CVM in response to a signal transmitted from somewhere other than the client computing device.

2. The method of claim 1, wherein the signal is transmitted after a specified duration of time.

3. The method of claim 1, wherein the client computing device is further mounts the CVM on the client computing device.

4. The method of claim 1, further comprising transmitting the license key to a key server, wherein the key server the license key to the client computing device.

5. The method of claim 1, further comprising:
    transmitting to the client computing device a timeout interrupt corresponding to the specified duration of time and the CVM,
    wherein the client computing device stops the CVM in response to the timeout interrupt.

6. The method of claim 5,
    wherein the client computing device re-requests the license key from the key server; and
    access to the CVM is enabled on the client computing device, using the re-requested license key, in response to the re-requesting.

7. The method of claim 1, further comprising verifying that the client computing device is authorized to receive the CVM.

* * * * *